March 9, 1965 M. W. MARIEN 3,172,672
OIL CONTROL RING
Filed Aug. 15, 1958 3 Sheets-Sheet 1
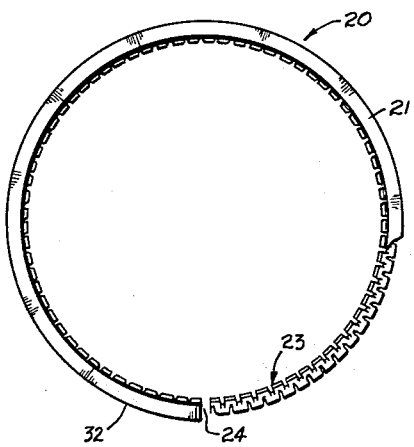
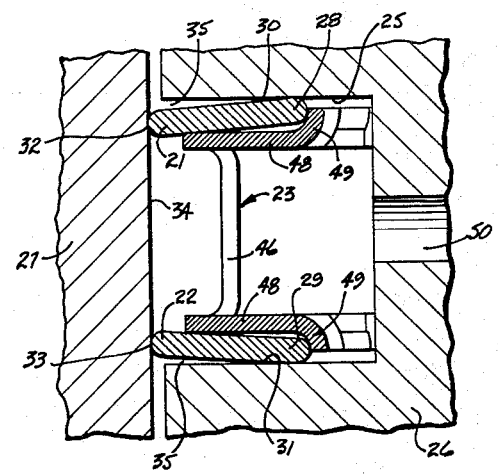
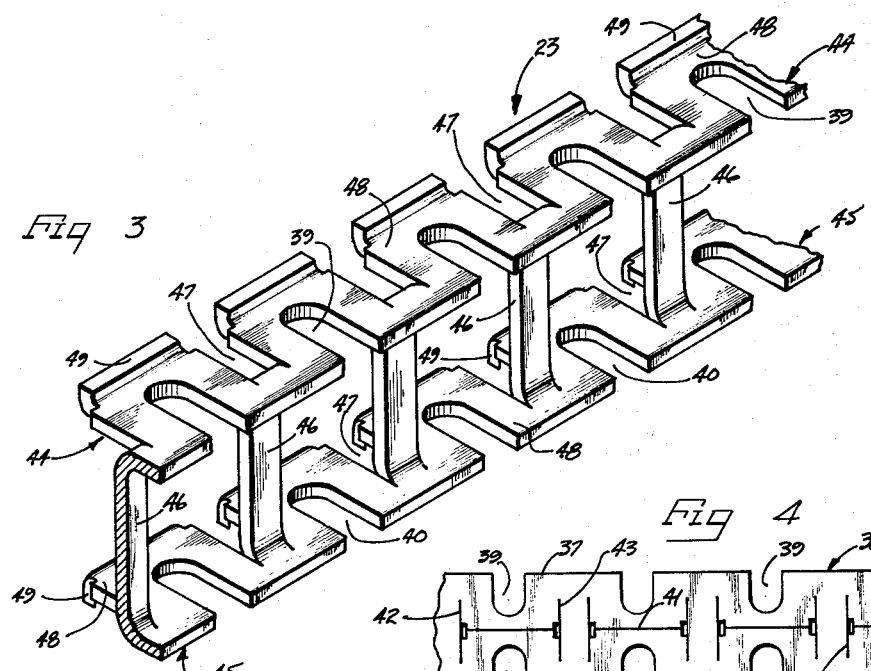
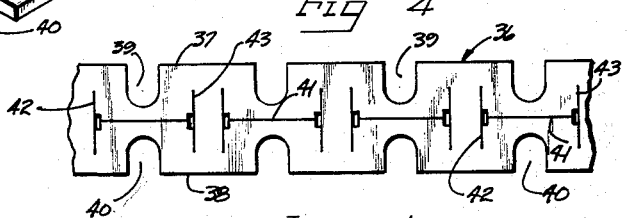
Inventor
MELVIN W. MARIEN

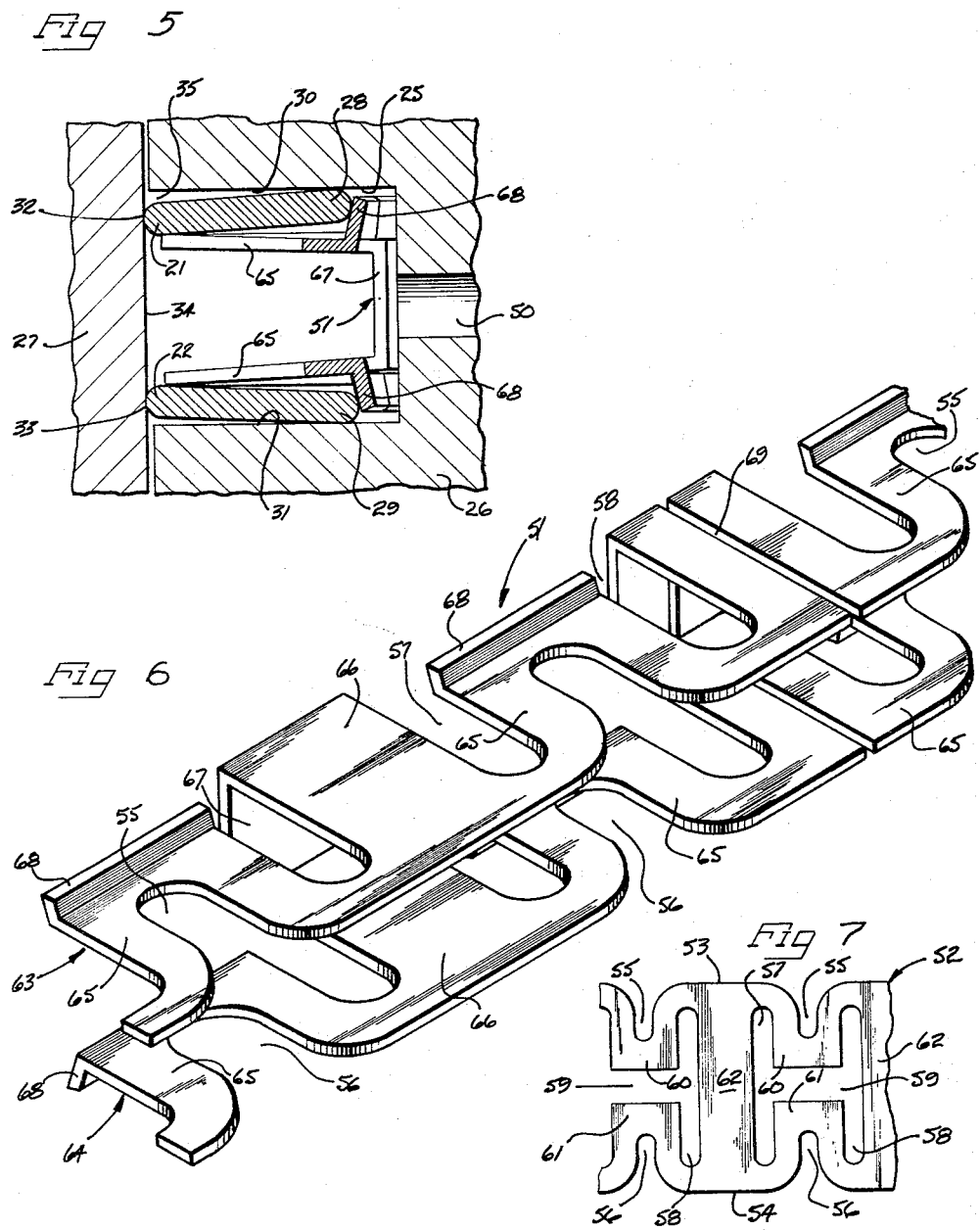

March 9, 1965 M. W. MARIEN 3,172,672
OIL CONTROL RING
Filed Aug. 15, 1958 3 Sheets-Sheet 3

Inventor
MELVIN W. MARIEN
by Hill, Sherman, Meroni, Gross & Simpson Attys.

United States Patent Office 3,172,672
Patented Mar. 9, 1965

3,172,672
OIL CONTROL RING
Melvin W. Marien, Brentwood, Mo., assignor to Ramsey Corporation, Manchester, Mo., a corporation of Ohio
Filed Aug. 15, 1958, Ser. No. 755,209
6 Claims. (Cl. 277—140)

The present invention relates broadly to oil control piston ring assemblies, and is more particularly concerned with an oil control ring and assembly having a free draining sheet metal circumferential spacer and expander ring associated therewith.

It is an important aim of the present invention to provide an oil control piston ring assembly which may be fabricated of relatively low cost spring metals by high speed production techniques and which additionally may be rapidly located in the desired position without resort to special installation tools.

Another object of this invention lies in the provision of a very open free draining sheet metal circumferential spacer and expander ring for rail ring assemblies featuring staggered oppositely opening slots or grooves in the rail ring supporting rows of axially spaced crowns which increase oil drainage and circumferential extensibility and contractability.

Another object of the invention is to provide an expander-spacer structure for oil control rings characterized by axially spaced rows of circumferentially spaced crowns or leg members having protuberances or lips along the inner edge thereof engageable with the inner circumferential edges of rail rings, and connected in axially spaced relation by circumferentially spaced axially extending cross elements which may be radially positioned as desired from the inner periphery to the outer periphery of the ring.

Another object of the present invention lies in the provision of a spacer and expander ring composed of axially spaced generally radially corrugated rail supporting sides shaped with an absence of relatively sharp bends in areas of stress, whereby the possibility of fracture in said areas is rendered essentially remote.

A further object of this invention is to provide a spacing and expanding device for rail rings featuring the formation of relatively wide spaced surfaces for engagement with the inner peripheral edges of the rail rings to substantially reduce wear upon said peripheral edges.

A still further object of the present invention is in the provision of an oil control ring assembly which is readily adapted for use in oil control ring grooves of different axial and radial dimensions.

Other objects and advantages of the invention will become more apparent during the course of the following description, particularly when taken in connection with the acompanying drawings.

In the drawings, wherein like numerals are employed to designate like parts throughout the same:

FIGURE 1 is a plan view of an oil control ring assembly according to the principles of this invention, with parts broken away to more clearly illustrate features thereof;

FIGURE 2 is a fragmentary sectional view of piston and cylinder structure, showing the oil control ring assembly of this invention located in an oil ring groove of the piston;

FIGURE 3 is a fragmentary isometric illustration of an expander and spacer ring embodying the novel concepts of this invention;

FIGURE 4 is a fragmentary plan view of a strip of metal as punched and prior to the formation therefrom of the expander-spacer ring of this invention;

FIGURE 5 is a fragmentary sectional view of piston and cylinder structure and a modified form of spacer and expander construction positioned therein;

FIGURE 6 is a fragmentary isometric view of the expander-spacer ring of FIGURE 5, and also constructed in accordance with the principles of this invention;

FIGURE 7 is a fragmentary plan view of a strip of material from which may be formed the spacing and expanding device of FIGURES 5 and 6.

Figure 8:
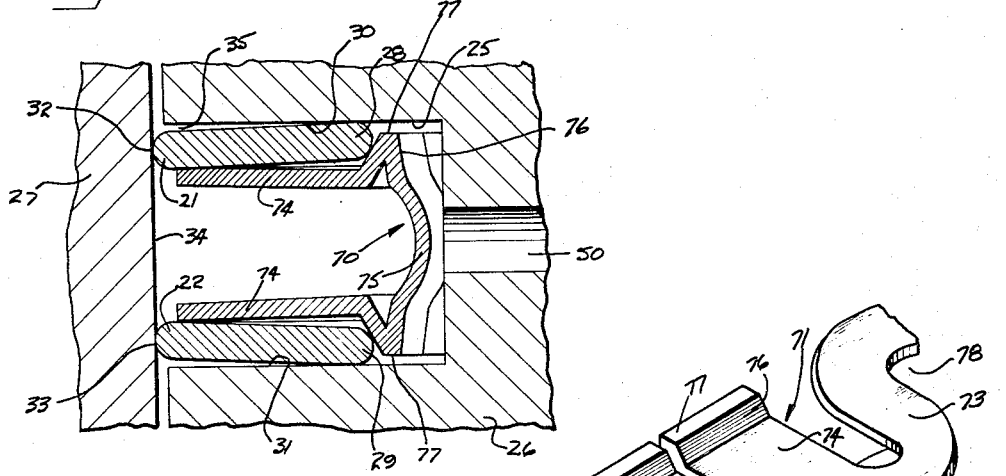
FIGURES 8, 9 and 10 are illustrations similar to the preceding three views, and showing a further form of circumferential spacer and expander embodying the novel concepts of this invention.

Briefly stated, a circumferential spacer and expander for oil control piston rings as constructed in accordance with the principles of this invention is formed from a strip of resilient material in a manner to provide spaced connecting leg members which bear axially and radially against a pair of rail rings, to thereby maintain the outer circumferential edges of the rail rings in sealing contact with the cylinder. Each of the leg members of the spacer-expander ring is provided with spaced generally U-shaped grooves along the inner and outer circumference thereof with the grooves on one circumference staggered and disconnected or circumferentially spaced from the grooves on the other circumference of the leg members to provide a plurality of single thickness circumferentially spaced leg segments. One end or the radially inward portion of each segment is formed with an abutment or tab which bears against the inner circumferential edges of the rail rings. Various other novel structural features of the present invention will become apparent as the description proceeds.

Referring now to FIGURES 1 and 2, an oil control ring assembly designated generally by the numeral 20 comprises a pair of relatively thin, split and expansible rail rings 21 and 22 arranged in axially spaced relation and backed for radial and axial expansion by a circumferential spacer and expander ring 23. The rail rings are of known construction and generally are formed from a high chromium content steel, or may be chromium plated throughout or plated on only the outer peripheral edges.

The rail rings 21 and 22 are also commonly provided with a gap 24 extending through the radial width or thickness thereof to permit circumferential expansion and contraction of the rails. The rail rings 21 and 22 are received throughout a major portion of their radial length within a groove 25 provided in a piston 26 reciprocably received in a cylinder 27. By employment of an expander-spacer ring embodying the novel concepts of this invention, a generally axial force is applied to inner circumferential edge portions 28 and 29 of the rings to maintain an effective seal between said portions and surfaces 30 and 31 defining the axial depth of the groove 25 in the piston 26. In addition, a generally radially outwardly force is applied against the edge portions 28 and 29 to maintain an effective rubbing seal between outer circumferential edge portions 32 and 33 of the rail rings and inner face 34 of the cylinder 27. It may thus be seen that the expander-spacer ring 23 functions to dish the rail rings 21 and 22 outwardly and that normally a slight gap or opening 35 is present between the faces 30 and 31 defining the opening 25 and the rail rings slightly radially inwardly of the outer circumferential edge portions 32 and 33 of each ring. A biasing action accordingly occurs.

To accomplish the dishing or biasing action described, the circumferential spacer and expander ring 23 is formed in the manner of FIGURE 3 from a blank of the character illustrated in FIGURE 4. With reference first to the latter figure, an elongated blank 36 having generally parallel sides 37 and 38 is punched or otherwise cut to provide generally U-shaped spaced grooves or notches 39 along the side 37 and similarly shaped grooves 40 along the side 38. Further, and generally centrally of its transverse width, the blank 36 is slit in a substantially H-shaped configuration to provide spaced longitudinally extending slits 41 terminating at opposite ends in spaced transversely extending slits 42 and 43. The blank 36 is preferably constituted of a resilient oil resistant material, such as spring steel or the like, and the grooves 39 and 40 and slit lines 41–43 may be provided essentially simultaneously in a suitable punching operation.

To form the grooved and slit blank 36 into the shape of FIGURE 3, the blank is rolled or bent along a longitudinally extending band generally centrally of the opposite sides 37 and 38 to provide spaced leg members 44 and 45 parallelly disposed relative to one another by spaced connecting arms or crossbars 46. It may be noted that the crossbars 46 are formed from the blank material between the transverse slits 43 and 42 and that removal of material from this portion of the blank 36 provides generally U-shaped, straight-walled grooves or notches 47 opening in a direction opposite from the grooves 39 and 40 punched from the blank 36. It is to be further noted that the grooves 47 and the grooves 39 or 40 are disconnected from one another, and when the formed strip of FIGURE 3 is curved into circular configuration, said grooves are circumferentially spaced one to the other. There is accordingly provided in the spacer-expander ring substantial circumferential extensibility and contractability to assure that the desired biasing or dishing will occur and the rail rings 21 and 22 maintained in continuous sealing contact with the wall or face 34 of the cylinder 27.

Considering further the shape of FIGURE 3, the generally parallel leg members 44 and 45 are comprised of rows of circumferentially spaced crowns or leg segments 48 located between the grooves 47 and each having a groove 39 or 40 therein and a generally flat inner wall or base provided by the parallel sides 37 and 38 of the blank 36. The radially inner portion of each crown or leg segment 48, on the other hand, is curved vertically, as indicated at 49, to provide an edge portion engageable with the inner circumferential edges 28 and 29 of the rail rings 21 and 22. As is shown in FIGURE 2, the curvature of the edge portions 49 is calculated to assure substantial surface contact between the rail ring edge portions 28 and 29 and the expander ring portions 49 to prevent slippage between the parts and possible disengagement during reciprocating movement of the piston 26.

After shaping of the blank 36 in the manner described, the structure of FIGURE 3 is rolled into annular form and cut to proper length to produce a full circle ring 23 with the ends of the ring being brought into abutment. The ring 23 may then be positioned with reference to the rail rings 21 and 22 in the manner shown in FIGURE 2. By provision of the grooves 39, 40 and 47, a generally radially corrugated arrangement is obtained with an enhanced amount of circumferential extensibility and contractability when the ring is radially contracted in use to exert its expanding force, and in addition, the grooves or apertures provide an effected flow path for oil that might otherwise be trapped in the ring and not returned through the drain holes 50 in the piston 26. Further, the spacing and location of the connecting arms or crossbars 46 assures that the curved edge portions 49 of the leg segments 48 will remain in engagement with the inner circumferential edge portions 28 and 29 of the rail rings 21 and 22, respectively. In addition, the circumferential width of the leg segment edge portions 49 is such that a relatively broad surface contact is provided with the rail rings, and thereby excessive wear on the inner peripheral edges of the rail rings is rendered essentially remote.

For particular applications it may at times be desired to vary somewhat the shape of the circumferential spacer and expander ring, and one such modification falling within the novel concepts herein disclosed is shown in FIGURES 5, 6 and 7. Designated generally by the numeral 51, an expander-spacer ring is formed from a blank 52 of resilient oil resistant material. The blank is provided with generally parallel sides 53 and 54, and by punching or suitable techniques a plurality of spaced, generally U-shaped grooves or apertures 55 and 56 extend inwardly toward the center of the blank 52 from the sides 53 and 54, respectively. Inwardly toward the central portion of the longitudinal axis of the blank 52, and between the inner extremities of the grooves 55 and 56, the blank 52 is punched or otherwise apertured in a generally H-shaped configuration providing transversely extending grooves 57 and 58 connected by a longitudinally extending or cross groove 59. It may be seen that by the punching operation there is provided outwardly of each of the grooves 59 a pair of opposed tongue portions 60 and 61, and that between the groove 58 of each H-shaped aperture and the groove 57 of an adjacent H-shaped aperture is a transversely extending band or connecting portion 62.

To form the blank 52 of FIGURE 7 into the shape of FIGURE 6, the blank is rolled or bent along a generally longitudinally extending band in the central portion of the blank whereby the connecting portion 62 is provided with two generally right angle bends and the tongue portions 60 and 61 are disposed in generally parallel spaced relation with respect to one another.

The structure of FIGURE 6 as thus punched and shaped comprises a pair of spaced leg members designated generally as 63 and 64, each including a row of crowns or leg segments 65 characterized by a generally U-shaped configuration in plan and spaced longitudinally one from the other by a generally rectangular connecting portion 66. It is to be noted that the leg elements 65 and connecting portions 66 are maintained in spaced, generally parallel relation by a crossbar or upright 67 of essentially the same width as the portions 66. It is to be further noted that the expander-spacer strip of FIGURE 6 features between the leg elements and connecting segments 66 the grooves 57 and 58 opening outwardly in one direction, and that each leg segment or element 65 carries a groove 55 or 56 opening outwardly in the opposite direction. Accordingly, substantial circumferential extensibility and contractability is possessed by the expander-spacer strip 51 when shaped into a generally circular configuration. In addition, to assure that outer circumferential edge portions 32 and 33 of the rail rings 21 and 22 will be in continuous sealing contact with the cylinder wall each leg segment is turned upwardly or downwardly as at 68 to provide the engagement with the rail rings shown in FIGURE 5.

Subsequent to the punching or aperturing and shaping actions described, the structure of FIGURE 6 is formed into a generally circular configuration of the desired outer circumference when its ends are abutted at the gap or space 69 therebetween, as shown in FIGURE 6. The ring is then positioned between the rail rings 21 and 22 in the manner of FIGURE 5, and said rail rings are dished or biased into proper position and in sealing contact with the piston and cylinder.

As shown in FIGURE 5, the crowns or sides 65 flare axially outward so that the radial outer end of the spacer and expander has a greater axial depth than the inner end and the crowns only support the rails 21 and 22 at their outer ends to provide a wide gap of increasing axial depth as the rails approach the lips 68. This arrangement increases oil drainage capacity and resiliency of the assembly.

It will be also noted from FIGURE 5 that the crossbars 67 are radially inward from the crowns 65, whereas in FIGURE 2, the crossbars 46 are near the outer peripheries of the crowns 48.

Figure 9:
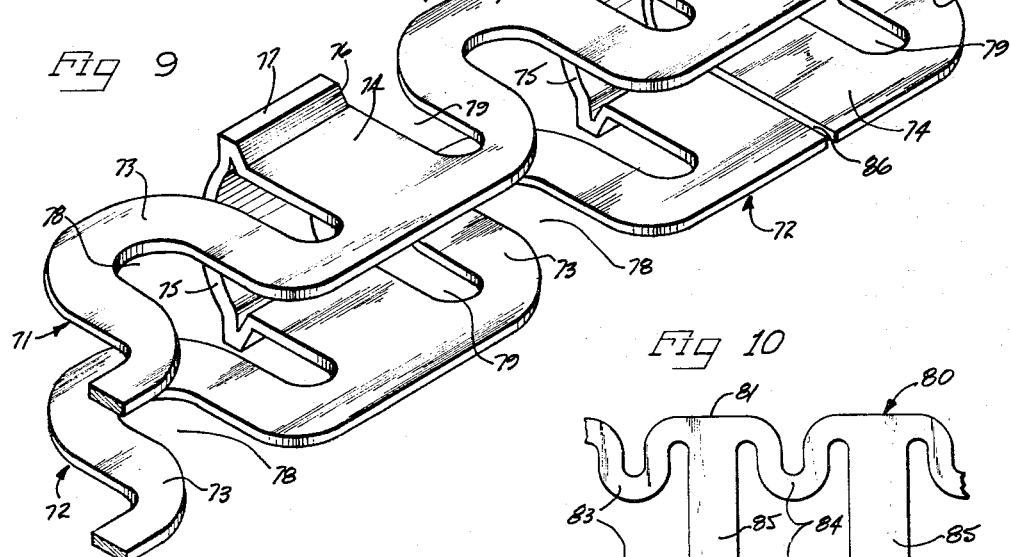
Figure 10:
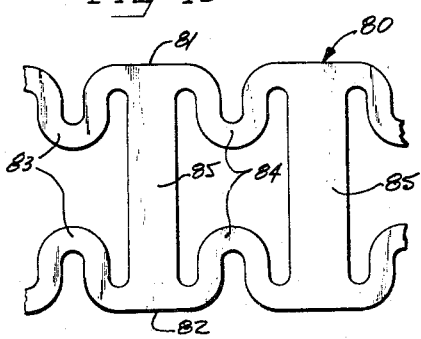

It may at times be desired to construct the expander-spacer strip in a manner such that the cross bar or vertical connecting leg is disposed as a continuation of the upwardly turned portion of the rail ring contacting leg segment. An arrangement of this character is shown in FIGURES 8, 9 and 10, and it may further be seen from this form of the invention that substantial structural variations are possible without departing from the principles of the present invention. A circumferential expander and spacer ring, designated generally in FIGURES 8 and 9 by the numeral 70, comprises a pair of parallel spaced leg members 71 and 72 providing a plurality of connecting generally U-shaped portions 73 between which is a generally rectangular leg segment 74 integral with and connected by a curved web or bight portion 75. The leg segments 74 are provided along one end with an upwardly turned edge portion 76 having a generally flat face 77 connecting with web portion 75. It is to be noted that opposite ends of the web portion 75 are generally flat and form a substantially V-shaped juncture with the outwardly turned portion 76 of each leg segment 74. Throughout the major portion of its depth or height, the web or bight portion 75 is generally convex as shown. To provide circumferential extensability and contractability of the expander-spacer ring 70, the leg members 71 and 72 are provided with the staggered groove arrangement appearing more clearly in FIGURE 9. Specifically, each connecting portion 73 is characterized by generally U-shaped groove 78 opening in one direction, while between the connecting segments 73 and the crowns or leg segments 74 is a groove 79 conforming generally to the shape of a U in plan. It is to be noted that the pairs of grooves 78 and 79 are in general vertical alignment after formation of the strip or ring 70 into the shape of FIGURE 9.

A resilient oil resistant material is employed to produce the expander-spacer ring 70, and a blank 80 of such material is punched in the manner shown in FIGURE 10. The blank 80 is provided with parallel sides 81 and 82 and is apertured by punching techniques to present spaced loop portions 83 and 84 connected by a transverse segment 85. After the blank 80 is punched to the shape of FIGURE 10, a rolling or bending step is employed directed along a generally longitudinally extending band midway of the width of the blank 80 to shape said blank into the configuration of FIGURE 9. During or separate from rolling or bending step, the blank 80 is crimped along the connecting transverse segment 85 to provide the outwardly flared edge portions 76 on the leg segments or crowns 74. The structure of FIGURE 9 is then rolled or shaped into annular form, and cut to the proper length to form a full circle ring with the ends abutting to close the gap 86.

The ring 70 as shown in FIGURE 8, like the ring 51 of FIGURE 5, has the crowns or lip 74 flared axially outward to increase the gap between the rails and crowns and impart greater oil drainage and resiliency to the assembly. The circumferential spacer and expander ring 70 when located between the rail rings 21 and 22, as shown in FIGURE 8, exerts the desired axial and radial force against said rail rings to assure a proper seal between the rail rings and cylinder wall and between the rail rings and the faces of the piston groove in the manner described in connection with FIGURES 1 through 4. Specifically, the outwardly flared edge portions 76 of the leg segments 74 bear axially and radially against the inner circumferential edge portions 28 and 29 of the rail rings 21 and 22, to provide engagement between said portions 28 and 29 adjacent faces of the piston groove, and simultaneously, to urge the outer circumferential edge portions 32 and 33 of the rail rings into sealing contact with the cylinder face, as previously described. The rail rings 21 and 22 are thereby dished or biased at an angle relative to the leg segments 74 and the piston face defining the groove in said piston.

Each of the circumferential spacer and expander rings 23, 51 and 70 herein described is characterized by its ability to be fabricated of relatively low cost materials by high speed production techniques and its ability to be rapidly located in the desired position without resort to special installation tools. Each structure shown is provided with staggered grooves on opposite edges which provide a substantial degree of circumferential extensibility and contractability when installed in the piston groove. When thus installed in the piston groove, the ends of the expander abut one another and accordingly the assembly is larger than the cylinder diameter and must be compressed radially so that it can enter the cylinder. When in the operating position, the circumferential expander-spacer exerts equally distributed radial forces against the rail rings. Further, by provision of spaced axially extending crossbars or connecting legs 46, 67 and 75, the respective outwardly flared edge portions of the expander ring forms shown are maintained in engagement with the rail rings, and the likelihood of slippage therefrom is essentially remote. It is to be further noted that each of the expander rings is free of sharp bends in areas of stress, and accordingly, there does not exist the possibility of fracture in said areas. Additionally, the outwardly flared edge portions 49, 76 and 68 each present a relatively broad contacting surface against the inner peripheral edges of the rail rings, and experience has established that excessive wear on the rail ring edges accordingly does not occur. Each expander-spacer ring as herein disclosed is further characterized by ready adaptability to piston grooves of varying radial and axial dimensions without modification to the expander ring. Also, as is now apparent, the location of the crossbars or connecting web may be varied relative to the outwardly flared edges of the leg segments and relative to radial thickness of the expander strip.

Various other modifications and variations may of course be effected in the structures herein disclosed without departing from the novel concepts of the present invention.

I claim as my invention:

1. A piston ring assembly comprising a pair of cylinder-engaging rails,
    and a spacer-expander between said rails for supporting the rails in axially spaced relation and for forcing the rails outwardly,
    said spaced-expander comprising a pair of axially spaced flat annular rows of horizontally corrugated rail supports with generally radially extending grooves in circumferentially spaced relation alternately opening inward from the outer circumference of the spacer-expander and outwardly from the inner circumference of the spacer-expander,
    integral legs positioned radially inward from the outer circumference of the spacer-expander holding said rows in axially spaced relation,
    and circumferentially wide lips on the inner ends of the segments radially inward from the outwardly extending grooves and between the inwardly extending grooves.

2. A circumferential spacer-expander ring for maintaining piston rail rings in sealing relation with the side walls of a ring groove and a cylinder wall comprising a U-shaped channel ring having top and bottom legs composed of circumferentially spaced flat rail supporting segments and circumferentially spaced portions having inner periphery bight portions connecting alternate segments of each leg,
    the segments between the portions having the bight connected leg segments being generally U-shaped in plan with their bight portions at the inner periphery of the ring,
    and upturned lips on said bight portions of the U-shaped segments for engaging the inner peripheries of the rail rings,
    and said bight portions connecting the legs of the channel being disposed radially inward from said lips.

3. A circumferential spacer-expander for piston rail rings which comprises a sheet metal channel ring of U-shaped cross-section with axially spaced top and bottom legs composed of circumferentially spaced spring segments and with a periphery bight portion composed of circumferentially spaced cross bars,
   said legs having flat relatively wide rail supporting faces,
   said segments of said legs including generally U-shaped spring portions circumferentially spaced and between the segments connected by said cross bars to provide a circumferential expansion force in each leg,
   and outturned lips at the radial inner ends of alternate segments of each leg for engaging the inner peripheries of rail rings supported on the legs.

4. A spacer-expander ring for piston rail rings which comprises a sheet metal U-shaped channel ring having top and bottom rail supporting legs and circumferentially spaced cross bars connecting the legs inwardly from the outer periphery thereof,
   each of said legs being composed of circumferentially spaced flat segments including cross bar connected segments and U-shaped spring segments between said cross bar connected segments,
   said legs diverging outwardly from the inner periphery of the channel ring to provide a channel having an outer axial depth greater than the inner axial depth thereof,
   and axially outturned and radially inwardly inclined lips on the inner peripheries of alternate leg segments for engaging the inner peripheries of rail ring supported on the segments,
   said lips coacting with the diverging outer ends of the legs to support rail rings in dished relation engaging the outer peripheries of the legs and the axially outer ends of the lips thereby providing oil draining gaps between the rail rings and the spacer-expander ring.

5. A piston ring assembly comprising a pair of cylinder-engaging rails,
   and a spacer-expander between said rails for supporting the rails in axially spaced relation and for forcing the rails outwardly,
   said spacer-expander comprising a pair of axially spaced flat annular rows of horizontally corrugated rail supports with generally radially extending grooves in circumferentially spaced relation alternately opening inward from the outer circumference of the spacer-expander and outwardly from the inner circumference of the spacer-expander,
   circumferentially wide lips on the inner ends of the segments radially inward from the outwardly extending grooves and between the inwardly extending grooves,
   an integral legs positioned radially inward from the outer circumference of the spacer-expander and radially outward from the circumferentially wide lips holding said rows of horizontally corrugated rail supports in axially spaced relation.

6. A piston ring assembly comprising a pair of cylinder-engaging rails,
   and a spacer-expander for holding the rails axially spaced and for forcing the rails outwardly,
   said spacer-expander comprising a pair of axially spaced flat annular horizontal corrugated springs between the rails,
   each of said springs being composed of circumferentially spaced relatively wide rail supporting segments separated by generally radially extending outwardly opening slots between inwardly opening slots,
   circumferentially wide outturned inclined lips on the inner end of alternate segments,
   and integral legs radially outward from the lips and radially inward from the outer periphery holding the pair of springs in axially spaced relation,
   said lips engaging a major portion of the inner peripheries of the rails and said legs separating the springs sufficiently to coact with the lips for holding the rails against the sides of a ring groove.

References Cited by the Examiner

UNITED STATES PATENTS

| | | | |
|---|---|---|---|
| 2,635,022 | 4/53 | Shirk | 277—140 |
| 2,830,861 | 4/58 | Marien | 309—45 |
| 2,893,798 | 7/59 | Olson | 277—139 |

LEWIS J. LENNY, *Primary Examiner.*

KARL J. ALBRECHT, RALPH H. BRAUNER, SAMUEL ROTHBERG, *Examiners.*